United States Patent Office 3,288,685
Patented Nov. 29, 1966

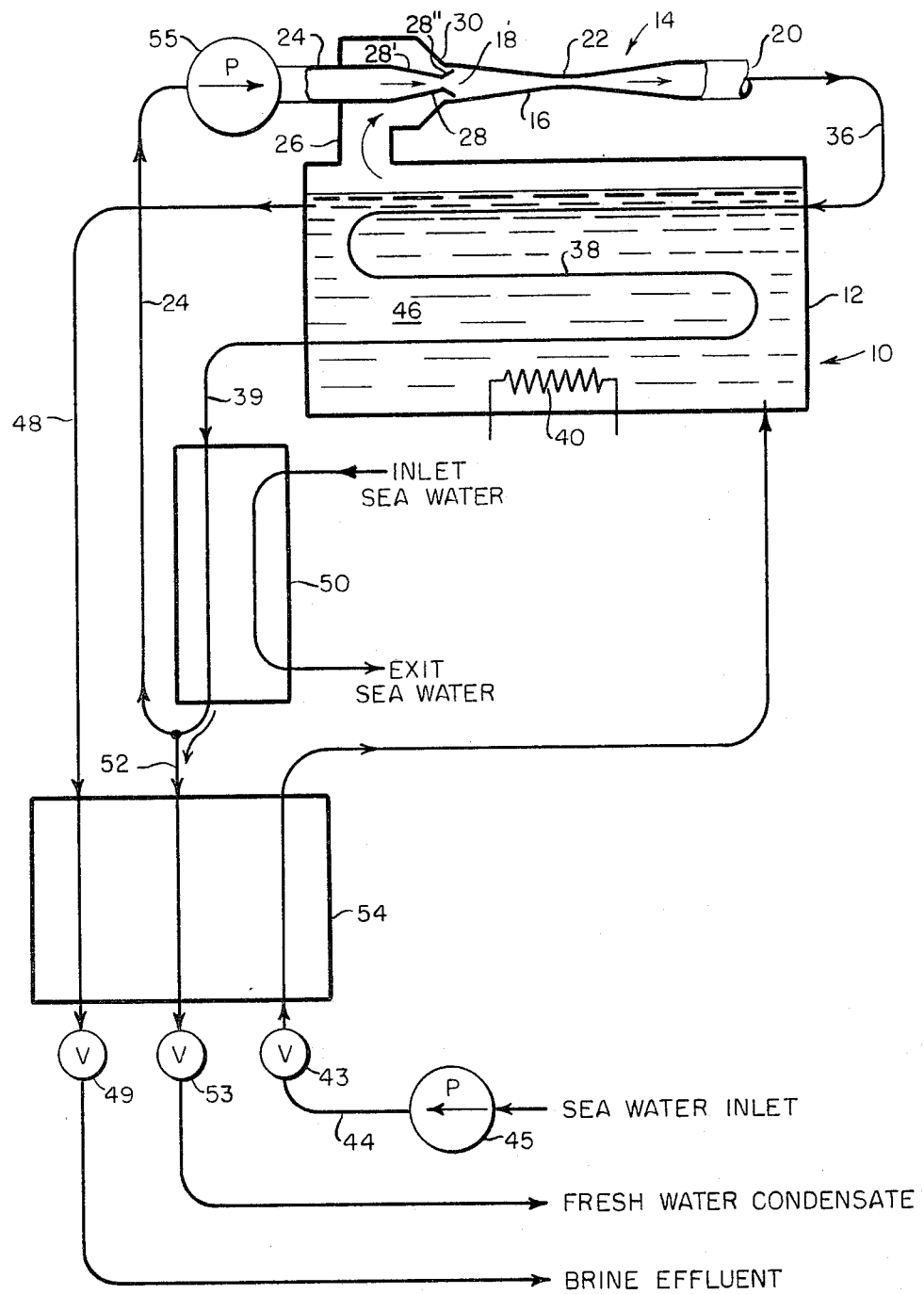

3,288,685
MULTIPLE-PHASE EJECTOR DISTILLATION APPARATUS AND DESALINATION PROCESS
Clarence A. Kemper, Waltham, George F. Harper, Framingham, and George A. Brown, Lexington, Mass., assignors to Joseph Kaye & Company, Cambridge, Mass., a corporation of Massachusetts
Filed Aug. 17, 1962, Ser. No. 217,577
9 Claims. (Cl. 203—11)

The present invention concerns an apparatus for and a method of distilling liquids, and particularly to the desalination of saline solutions by a multiple phase ejector apparatus and process. More particularly, the discovery relates to an apparatus for and a method of the economical recovery of potable water from impure water in which there is a partial regeneration of the latent heat of vaporization within the same evaporization stage.

It is an object of this invention to provide an improved apparatus for and a method of thermally distilling liquids. Another object is to provide an apparatus for and a process of economically and efficiently recovering potable water from sea water or other sources of impure or brackish water. An additional object is to provide an evaporating and condensing apparatus and a process in which the energy input means can be adapted to the most economical means available. It is also an object of this invention to provide a multiple stage apparatus for and a process of recovering fresh water from sea water wherein there is a partial regeneration of the latent heat of vaporization within each stage. Other objects and advantages will be apparent from the following detailed description of the invention taken in connection with the accompanying drawing in which:

The single figure is a diagrammatical representation of a single stage hybrid heat and work input multiple phase ejector apparatus for the desalination of sea water.

The economically competitive desalination systems which utilize distillation to remove fresh water from sea water can be classified into two general categories: the first includes those systems which require an energy input in the form of heat, and the second includes those which require an energy input in the form of work. For the purposes of this discussion, a single distillation stage will be defined as the combination of an evaporating process such as a boiling process and the subsequent condensing process undergone by a given fluid particle. In conventional multiple-effect evaporation systems, the heat for the lower second-stage boiling process is obtained from the first stage condensing process.

Thermodynamically, the better heat-input types of desalination systems resemble one another in that several distillation stages, or effects, are used at different temperature levels, such that the heat removed by condensation at each stage is transferred to the succeeding or lower temperature stage to boil or aid in the boiling of the saline solutions therein. The heat is supplied originally to the first, or highest temperature, stage and is equal to the heat of vaporization for each pound of fresh water produced in the first stage. The cascaded stages provide increased economy by essentially re-using the original heat input several times. The heat requirement per pound of fresh water produced is dependent upon the number of stages that can be operated in the available temperature interval. The number of stages is determined by the temperature difference in the boilers and the size of the overall temperature interval. The lower limit of this temperature interval is determined mainly by the lowest available heat sink temperature and by the fact that the vapor density is very low at vapor pressures attendant to temperatures of the order of 100° F. Generally, the inlet temperature of the sea water such as 40° to 90° F. is the lowest available sink temperature. The upper limit on the temperature interval occurs because the rate of scale deposition from sea-water increases markedly at higher temperatures. Therefore, the common maximum acceptable temperature for the distillation of sea water is considered to be between 250° F. and 300° F.

The principal work-input type of desalination system is the vapor-compression system. In this system, a pump or vapor compressor is used to achieve a temperature difference between the condensing vapor and the boiling brine. A single-stage vapor-compression system is completely regenerative thermally in that all the heat used to boil the sea water is derived from condensing the vapor. Excepting heat losses, a small amount of energy must be rejected from a vapor-compression system, but since it is difficult to reject this energy in the form of work, it must be rejected as heat and therefore cannot be used to operate a succeeding work input stage such as another vapor-compression stage.

Conventionally a single stage of a multiple-effect evaporator is not regenerative, in that none of the heat required to boil the sea water in a given stage is derived from condensing the vapor of that stage. The amount of energy to be rejected from each stage of such a system is equal to the total energy input to the stage, and this amount of energy may be utilized in successive heat-input stages quite advantageously.

There has now been invented a single distillation stage apparatus and method which is partially thermally regenerative within the same stage; that is, at least a part of the latent heat of vaporization of the condensing process is returned to the evaporating process in the same stage. Further, the apparatus and method permits the employment of the most economical input energy means available since either work input, heat input or a combination of heat and work input can be used in one or more stages. Additionally this invention provides a multiple stage apparatus and system which enhances thermal efficiency by being partially regenerative within each stage, and which requires less total heat input per pound of fresh water than a conventional multiple stage evaporator operating between the same temperatures and having the same temperature difference in the boilers. Furthermore the multiple-phase ejector apparatus is amenable to thermal cascading either with other ejector apparatus stages or conventional stages for further enhancement in performance and economy.

The partial regeneration within each stage is accomplished by the employment of a multiple-phase ejector into which is introduced a liquid-containing and a vapor-containing fluid stream which after mixing condenses at least a portion of the vapor-containing stream. A liquid stream such as water, and a gaseous stream, such as water vapor, are introduced into a mixing tube. Rapid mixing of the phases and rise in static pressure occur in this mixing process thereby condensing a part or substantially all of the water vapor. The fluid exit stream from a multiple-phase ejector will have an exit temperature higher than the inlet temperatures of either or of both the inlet vapor or the liquid streams. In the present invention the high temperature exit stream from the multiple-phase ejector accomplishes a portion of the boiling or evaporation process which generates all or a portion of the vapor inlet stream which enters the multiple-phase ejector. In the operation of the multiple-phase ejector one or more input streams is a liquid stream and one or more input streams is a vapor or gaseous stream which is capable of being condensed by the mixing action in the ejector. Further for employment in the instant discovery the exit stream from the multiple-phase ejector must be at a temperature exceeding the boiling temperature of the particular solution being processed under the process pressures employed. In desalination systems the multiple-phase ejector fluid exit stream must have a temperature exceeding the boiling temperature of the brine solution in the evaporation apparatus.

Of course the relatively high temperature exit stream from the multiple-phase ejector can be a single phase stream such as a completely condensed liquid stream containing only trace amounts of noncondensable gases such as air, or it can be a mixed phase liquid-vapor stream. The apparatus of the invention will be described in reference to a bifunctional hybrid heat and work energy input apparatus employing a two-phase liquid-vapor ejector exit stream, although, of course, it is recognized that an ejector with a single phase exit stream may be used or that the energy input may be heat alone or work alone.

Referring now more particularly to FIG. 1 there is shown therein a single stage multiple-phase ejector (MPE) desalination apparatus 10 which comprises in combination a boiler 12 or other liquid evaporating means and an MPE apparatus 14. The multiple-phase ejector 14 comprises in combination a contoured phase mixing section or means whereby a liquid and vapor stream are admixed, one embodiment being represented by a mixing tube 16 adapted to permit the flow therethrough of a fluid and characterized by an inlet opening 18 and an exit opening 20 and having a converging sloping internal flow path to a constricted internal fluid flow path 22 of predetermined length and flow area and thereafter diverging through a sloping internal flow path to the exit opening. In liquid flow and gas flow communication with the inlet opening are a liquid phase inlet conduit 24 and a vapor phase inlet conduit 26 the ends of which are tapered and contain a coaxially aligned center liquid nozzle 28 and a surrounding peripheral annular vapor nozzle 30 in communication with a plenum chamber, whereby the liquid and vapor phase stream may be introduced into the inlet opening of the mixing tube. The nozzles may be supersonic nozzles such as convergent-divergent nozzles on one or more of the conduits, the supersonic nozzle 28 having its convergent and divergent regions at 28' and 28'', respectively, or the nozzles may be placed side by side or other arrangements which permit the rapid introduction of both streams into the mixing section of the mixing tube. The physical size and openings of the nozzles and the fluid flow path of the mixing tube depend on the size of the unit and the rate and quantity of water to be recovered. As thus arranged the ejector permits a liquid stream and a vapor stream to be introduced into the mixing tube, and to exit at the exit opening 20 either as a single phase or a mixed or multiple-phase exit stream of higher temperature than the solution in the boiler or the vapor phase stream when removed from the boiler. The relatively high temperature exit stream is placed in a noncontact heat exchange relationship with the internal section of the boiler through an exit conduit 36 and a heat exchange coil 38 disposed within the boiler. The boiler 12 may optionally contain therein a heat energy input means such as an electrical emersion type heater 40 to supply the initial and additional heat needed to evaporate and boil the sea water to be processed. One end of the vapor inlet conduit 26 is in gas flow communication with the internal vapor space of the boiler 12.

The boiler 12 contains therein sea water 46 or other brackish or impure water to be boiled or evaporated, the sea water being introduced into the boiler through a sea water inlet conduit 44 containing flow regulating valve 43 and a liquid flow pump 45. Disposed below or about the liquid-vapor level within the boiler is one end of a brine effluent conduit 48 containing a flow regulating valve 49 which permits the flow controlled withdrawal from the internal section of the boiler and the rejection of the brine effluent solution. The ejector exit stream, after passing through the heat exchange coils 38 within the boiler, is withdrawn from the boiler through boiler exit conduit 39 and passed through a heat exchanger 50, whereby part of the fresh water condensate is removed through the water recovery conduit 52 containing a flow regulating valve 53. The remaining part of the liquid stream is pumped and recycled by liquid pump 55, such as a centrifugal or positive displacement pump or other liquid flow pumping means representing the work input means, back through the nozzle 28 into the mixing tube of the ejector. The heat exchanger 50 may employ a relatively low temperature sea water cooling inlet stream for heat exchange purposes with the relatively high temperature exit stream in conduit 39. The sea water coolant exit stream now at a relatively high temperature may be subsequently employed as part of the sea water inlet stream in conduit 44. Of course the heat rejected to heat exchangers 50 and 54 can also be rejected to lower stage heat input stages in multiple stage units except in the lowest stage of the process when waste heat is merely rejected. It is also advantageous to place the outgoing recovery conduit 52, containing relatively high temperature fresh water, in a heat exchange relationship together in heat exchanger 54 with the relatively high temperature brine effluent conduit 48 and the relatively low temperature sea water inlet conduit 44 thereby aiding to increase the temperature of the incoming sea water to be processed, and utilizing within the same stage waste heat.

In the operation of this apparatus, sea water having a relatively low temperature of about 40–90° F. is introduced through conduit 44 into boiler 12 wherein it is maintained in a boiling state initially by heat input means such as the heating coils 40 or work input means such as pump 55 and in operation by the combined action of the heat input heating coils 40, and the work input pump 55 in combination with the heat attained from the relatively high temperature ejector exiting stream which is introduced into the boiler in a heat exchange relationship through coils 38 from conduit 36. The water vapor from the boiling sea water at a temperature of from 100° F. to 500° F., e.g. 250° F., passes upwardly through the vapor inlet conduit 26 to the mixing tube 16 of the ejector where the water vapor is partially condensed by the simultaneous introduction of and mixing with the liquid water from a liquid phase conduit 24. The mixed liquid water and water vapor ejector exit stream emerging from the exiting opening 20 have a temperature higher, e.g. 10° F. higher, than the boiling temperature of the sea water within the boiler. This ejector exit stream is then placed in heat exchange relationship through coils 38 with the lower temperature boiling sea water 46 in the boiler thereby providing a partial regeneration of the latent heat of vaporization of the water vapor inlet stream within the same stage. The ejector exiting stream, once it has given up some of its latent heat of vaporization to the sea water in the boiler, is then circulated out of the boiler through conduit 39 to a heat exchanger 50 where the condensation process is completed followed by the removal of a portion of the condensate or fresh water through conduit 52 and the recycling of the remainder through conduit 24 to the ejector 14. The concentrated brine effluent in the boiler is continually removed from the boiler through conduit 48 as more relatively low temperature sea water is continually introduced into the boiler through conduit 44.

The sea water coolant inlet stream used to cool the exit stream in the heat exchanger 50 is withdrawn from the heat exchanger as the sea water cooling exiting stream and since it has a higher temperature than the sea water inlet stream of conduit 44 may be recycled and used either alone or in combination with fresh sea water in conduit 44. Additionally since the fresh water condensate and brine effluent will be at a relatively high temperature as compared with the introductory sea water in conduit 44 these conduits are advantageously placed in the heat exchange relationship in heat exchanger 54 with the inlet sea water conduit 44 to further enhance the temperature of the inlet sea water stream and aid the thermal efficiency of the process.

Example I

In a more detailed embodiment employing a work input MPE apparatus, that is, without the use of heating coil 40 other than for start up purposes, and wherein the energy input during operation is derived from liquid pump 55, sea water is introduced into conduit 44 by pump 45 and into heat exchanger 54 at 60° F. at a pressure (p.s.i.a.) of 29.8 and a flow rate of 4/3 lb. per second leaving the heat exchanger 54 and entering the boiler 12 at the boiling temperature of 250° F. The water vapor in the boiler 12 is introduced into the inlet opening 18 of the ejector 14 at a mass transfer rate of 1 lb. per second at 250° F. and a pressure of 29.8, while the water from liquid inlet conduit 24 is ejected from the outlet side of pump 55 and into ejector opening 18 at 11.1 lb. per second at 260° F. and a pressure of 535.4. The ejector nozzles 30 and 28 are designed to provide a vapor stream velocity of 368 ft. per second and a liquid vapor velocity of 295 feet per second, respectively, giving a mixing velocity in the constricted section of 301 ft. per second and a pressure of 28.8, thereby providing a mixed phase water-water vapor exit stream from opening 20 having a temperature of 260° F., a flow rate of 12.1 lb. per second and a pressure of 35.4. This exit stream is then circulated through coils 38 whereby a portion of the water vapor is condensed by the lower temperature boiling sea water 46 to provide a partial regeneration of the latent heat of vaporization within the same stage. The partially condensed exit stream at 260° F. is withdrawn through boiler exit conduit 39 and introduced into heat exchanger 50 to complete the condensation of the water vapor in the stream, the flow rate of the cooling inlet sea water through the heat exchanger being adjusted to remove the remaining heat of condensation. The exit stream is withdrawn from the heat exchanger or condenser 50 at 260° F. and at a flow rate of 11.1 lb. per second and a pressure of 35.4, while a portion of the fully condensed stream is removed by conduit 52 at 260° F., a pressure of 35.4 and a flow rate of 1 lb. per second. The fresh water stream together with the brine effluent in conduit 48 at 250° F. are placed in a heat exchange relationship in heat exchanger 54 with the sea water inlet conduit 44 to give fresh water from the stage at 73.1° F. a flow rate of 1 lb. per second, and a pressure of 35.4, while the brine effluent is discharged at 73.1° F., a pressure of 29.8, and a flow rate of ⅓ lb. per second.

It is of course recognized that some of the waste heat from this system either of the work input or heat input or hybrid type can be used to supply the heat requirements of a number of succeeding cascade stages of the heat input type with a substantial reduction in the heat or work requirements per pound of fresh water produced. The hybrid work-heat input apparatus described can thus be combined with other MPE heat input stages or conventional heat input apparatus as lower stages. Where heat is to be rejected to a lower stage the optional heat exchanger 54 may be eliminated with the heat of the water condensate and condenser coolant streams rejected to lower units.

As described the apparatus and process will find particular utility in those economic areas and conditions where the relative prices of the heat input and work input means vary thereby permitting the system to take advantage of the most economical energy means available. For example it is possible for the system as described to accept both the work input from such as the shaft power output from a diesel engine and the heat input from the heat rejected from the same diesel engine. It should be noted additionally that there are no vapor compressors required in the system described. Although the apparatus and process have been described in reference to a desalination system it is recognized that such an apparatus can be employed in the wide variety of situations which require the efficient and economical removal of a condensable vapor from a liquid solution, such as the concentrations of chemical solutions like sulfuric acid, nitric acid etc., purifying aqueous or organic solutions containing salts, bacterial sludges, etc., softening hard water and other processes wherein a volatile liquid is evaporated from a solution and condensed. The apparatus and process described may furthermore be used in freezing process desalination systems by having the ejector remove the relatively low temperature vapors, such as steam, from the freezing brine by the condensing of said vapor through a liquid or water stream in the ejector.

The apparatus and operation of this invention have been described in particular with regards to a mixed phase ejector that is the ejector exit stream comprising a mixed stream of water vapor and water. It is within the scope of this invention that the ejector may have a single phase liquid exit stream having trace quantities of noncondensable gases. In this situation the liquid water leaving the ejector has a temperature high enough for it to be used to boil the brine within the boiler and no condensation of water vapor takes place in the coils 38 or the heat exchanger 50. In this situation the heat exchanger 50 is employed to cool the liquid stream and the fresh water stream can be recovered before or after the heat exchanger 50. In the mixed phase ejector systems the mixture of water vapor and liquid is discharged from the ejector into the boiler where the water vapor in the exit stream is either fully or partially condensed in the coils 38 by the lower temperature boiling brine. When partial condensation occurs the heat exchanger 50 completes the condensation prior to the exit stream reaching the liquid pump 55, and the fresh water condensate is removed after full condensation has taken place. Thus in a heat input apparatus heat exchanger 50 could be a water cooler, in a work input apparatus heat exchanger 50 could be a condenser, with little or no change in temperature of the exit stream, while in hybrid systems it could be either or both, depending upon the phase condition of the exit stream in conduit 39. Therefore in the mixed phase ejector systems the exiting stream contains a gas phase such as water vapor in which the condensation of the water vapor occurs at a higher temperature than the boiling of the solution within the boiler. In the system described the pure water condensate is at a higher temperature than the boiling temperature. This temperature difference existing between the fresh water and the incoming sea water is then optionally employed for counterflow heat regeneration in heat exchanger 54.

What is claimed is:
1. A process for the distillation of a liquid and the partial regeneration of the latent heat of vaporization which process comprises:
    increasing the pressure of a liquid stream;
    accelerating and expanding the liquid stream by converging and then diverging it to obtain a high velocity stream;
    accelerating a separate vapor stream, obtained from a body of liquid, by converging the vapor stream;
    mixing the high velocity stream and the accelerated vapor stream by passing them together through a converging mixing chamber;
    decelerating the resultant mixed vapor and liquid stream by diverging it to obtain an exit stream having a higher temperature than the vapor stream prior to acceleration; and
    placing the exit stream in a heat exchange relationship with the body of liquid from which the vapor was obtained to condense at least a portion of the stream and thereby providing a partial return of the latent heat of vaporization to the liquid body.

2. The method of claim 1 wherein the liquid stream is accelerated to a supersonic velocity.

3. The method of claim 1 which includes recycling at least a portion of the condensed exit stream as the liquid stream to be increased in pressure, and recovering a portion of the condensed exit stream.

4. The method of claim 1 which includes withdrawing the condensed exit stream from the heat exchange relationship with the body of liquid from which the vapor was obtained and placing at least a portion of the withdrawn condensed exit stream in a heat exchange relationship with another liquid having a lower temperature.

5. A process for the improved thermal distillation of nonpotable water which process comprises:
  increasing the pressure of a potable condensate stream;
  accelerating and expanding the potable condensate stream by converging and then diverging it to produce a high velocity stream;
  accelerating a separate water vapor stream, obtained from a body of nonpotable water, by converging the vapor stream;
  mixing the accelerated vapor stream with the high velocity stream by passing them together through a converging mixing chamber;
  decelerating the resultant mixed stream by diverging it to obtain a two phase exit stream having a higher temperature than the water vapor stream;
  condensing the exit stream in a heat exchange relationship with the body of nonpotable water from which the vapor was obtained thereby providing a partial return of the latent heat of vaporization to the body and obtaining a potable condensate stream;
  withdrawing the last-mentioned potable condensate stream from the heat exchange relationship with the body of nonpotable water;
  recycling at least a portion of the withdrawn potable condensate stream as the condensate stream to be increased in pressure;
  placing at least a portion of the withdrawn condensate stream in a heat exchange relationship with a liquid having a lower temperature; and
  recovering at least a portion of the withdrawn potable condensate stream.

6. A process for the desalination of saline water which process comprises:
  heating a body of saline water to obtain a water vapor stream and a brine effluent liquid;
  increasing the pressure of a fresh water stream;
  accelerating and expanding the fresh water stream by converging and then diverging it to produce a high velocity stream;
  accelerating the water vapor stream by converging it;
  mixing the accelerated vapor stream with the high velocity stream by passing them together through a converging mixing chamber;
  decelerating the resultant mixed stream by diverging it to obtain a two phase exit stream having a higher temperature than the vapor stream prior to acceleration;
  condensing the exit stream in a heat exchange relationship with a body of saline water thereby providing a partial recovery of the latent heat of vaporization and obtaining a fresh water stream;
  placing the last-mentioned fresh water stream in a heat exchange relationship with a liquid at a lower temperature;
  recycling a portion of the last-mentioned fresh water stream for acceleration and expansion;
  recovering a portion of the last-mentioned fresh water stream as potable water; and
  withdrawing the brine effluent liquid as additional saline water is introduced into the body of saline water.

7. An apparatus for recovering potable water which apparatus comprises in combination:
  a pump to increase the pressure of a condensate stream;
  a converging-diverging nozzle to accelerate and expand the condensate stream from said pump to obtain a high velocity stream;
  means to heat a body of non-potable water to produce a water vapor stream;
  a converging nozzle to accelerate the water vapor stream;
  a converging mixing chamber through which the high velocity stream and the accelerated water vapor stream are passed in intimate contact to mix the streams;
  diverging tube means to decelerate the resultant mixed streams to obtain an exit stream having a higher temperature than the temperature of the vapor stream prior to expansion;
  means to place the exit stream in a heat exchange relationship with a body of nonpotable water to produce a condensate stream thereby providing for the partial recovery of the latent heat of vaporization;
  means to recover a portion of the last-mentioned condensate stream as product fresh water; and
  means to recycle a portion of the last-mentioned condensate stream to the pump.

8. The apparatus of claim 7 wherein the nozzle constitutes means for obtaining a supersonic velocity stream.

9. The apparatus of claim 7 which includes additionally means to place a portion of the last-mentioned condensate stream in a heat exchange relationship with a body of nonpotable liquid at a lower temperature.

References Cited by the Examiner

UNITED STATES PATENTS

| | | | |
|---|---|---|---|
| 585,365 | 6/1897 | Skiffington | 165—108 |
| 849,579 | 4/1907 | Siebel | 203—26 |
| 896,460 | 8/1908 | Prache et al. | 202—174 |
| 1,213,596 | 1/1917 | De Baufre | 159—24 |
| 1,600,106 | 9/1926 | Fothergill | 159—2 |
| 2,696,465 | 12/1954 | Kittredge | 203—23 X |
| 3,109,782 | 11/1963 | Nathan | 203—25 |
| 3,206,380 | 9/1965 | Daviau | 202—185 |
| 3,214,352 | 10/1965 | Wells | 202—187 |

NORMAN YUDKOFF, *Primary Examiner.*

WILBUR BASCOMB, *Examiner.*